(12) United States Patent
Nurminen et al.

(10) Patent No.: US 8,190,938 B2
(45) Date of Patent: May 29, 2012

(54) METHOD AND APPARATUS FOR CONTROLLING ENERGY CONSUMPTION DURING RESOURCE SHARING

(75) Inventors: Jukka Nurminen, Espoo (FI); Imre Kelényi, Budapest (HU)

(73) Assignee: Nokia Corporation, Espoo (FI)

( * ) Notice: Subject to any disclaimer, the term of this patent is extended or adjusted under 35 U.S.C. 154(b) by 615 days.

(21) Appl. No.: 12/362,193

(22) Filed: Jan. 29, 2009

(65) Prior Publication Data

US 2010/0191994 A1 Jul. 29, 2010

(51) Int. Cl.
*G06F 1/00* (2006.01)
*H04B 1/38* (2006.01)

(52) U.S. Cl. .......... 713/323; 713/300; 455/574

(58) Field of Classification Search .......... 713/323
See application file for complete search history.

(56) References Cited

U.S. PATENT DOCUMENTS

| | | | |
|---|---|---|---|
| 6,035,374 A * | 3/2000 | Panwar et al. | 711/118 |
| 7,508,781 B2 | 3/2009 | Liu et al. | |
| 7,551,948 B2 | 6/2009 | Meier et al. | |
| 7,877,109 B2 * | 1/2011 | Hyon et al. | 455/522 |
| 2007/0160027 A1 | 7/2007 | Muqattash et al. | |
| 2008/0095091 A1 | 4/2008 | Surineni et al. | |
| 2008/0123577 A1 | 5/2008 | Jaakkola et al. | |
| 2009/0124301 A1 * | 5/2009 | Raissinia | 455/574 |
| 2010/0115314 A1 * | 5/2010 | Sultenfuss | 713/323 |

FOREIGN PATENT DOCUMENTS

| | | |
|---|---|---|
| WO | WO 99/60711 A1 | 11/1999 |
| WO | WO 2006/025024 A1 | 3/2006 |

OTHER PUBLICATIONS

"Community-Based Asynchronous Wakeup Protocol for Wireless Peer-to-Peer File Sharing Networks", Leung, A.K-H., Kwok, Y.-K., pp. 342-350, Published Jul. 17-21, 2005 (http://ieeexplore.ieee.org/Xplore/login.jps?url=http%3A%2F%2Fieeexplore.ieee.org%2Fiel5%2F10342%2F32905%2F01541014.pdf&authDecision=-203).

Selim Gurun, Priya Nagpurkar, Ben Y. Zhao, Energy Consumption and Conservation in Mobile Peer-to-Peer Systems, In Proceedings of the 1st international Workshop on Decentralized Resource Sharing in Mobile Computing and Networking (Los Angeles, California, Jul. 25-25, 2006). MobiShare '06. ACM, New York, NY, 18-23.

Madhu Venugopal, Pramod Ramappa, Deep Desai, Energy efficient P2P protocol, Project Report, UCSB.

J. K. Nurminen and J. Nöyränen, Energy-Consumption in Mobile Peer-to-Peer—Quantitative Results from File Sharing, in Proceedings of the Fifth IEEE Consumer Communications & Networking Conference (CCNC) 2008.

(Continued)

*Primary Examiner* — Suresh Suryawanshi
(74) *Attorney, Agent, or Firm* — Ditthavong Mori & Steiner, P.C.

(57) ABSTRACT

An approach is provided for controlling energy consumption during resource sharing. One or more peer nodes determine scheduling information relating to when the peer nodes can utilize a predetermined level of communication capacity for sharing a computer resource (e.g., sharing content). The peer nodes transition between an active state for sharing the computer resource at the predetermined capacity and an inactive state to minimize energy use according to the scheduling information until the content transfer is complete.

20 Claims, 10 Drawing Sheets

OTHER PUBLICATIONS

Kelenyi, I. and Nurminen, J.K., Optimizing Energy Consumption of Mobile Nodes in Heterogeneous Kademlia based Distributed Hash Tables, Second International Conference and Exhibition on Next Generation Mobile Applications, Services and Technologies, Cardiff, Wales, UK, Sep. 2008.

J.H Blackburn, Reducing the Energy Consumption of Peer-to-Peer Networks, submitted to the 19th Annual Argonne Symposium for Undergraduates in Science, Engineering and Mathematics, Aug. 2008, University of Florida, Department of Computer Science and Engineering, Tampa, Florida 33620.

International Search Report and Written Opinion for corresponding International App. No. PCT/FI2010/050008 dated Apr. 26, 2010, pp. 1-15.

* cited by examiner

METHOD AND APPARATUS FOR CONTROLLING ENERGY CONSUMPTION DURING RESOURCE SHARING

BACKGROUND

Wireless (e.g., cellular) service providers, for example, continue to develop more enhanced network services and applications. Consequently, manufacturers of mobile devices (e.g., cellular phones) are challenged to continually add greater and greater functional capabilities in smaller and smaller form factors. Beyond the already advanced telephony and data capabilities, these devices can include other sophisticated functions and applications. The goals of greater functionalities with reduced form factor are at odds with the design of the power system of the mobile devices, in that generally more functions require more battery consumption.

For example, peer-to-peer (P2P) resource sharing (e.g., content sharing) applications have emerged as one of the most widely used and popular applications over the global Internet, and thus have attracted greater interest in deployment within wireless devices. P2P applications, however, place a heavy demand on energy consumption when actively sharing resources. Consequently, prolonged use of a P2P application on a wireless device may quickly deplete the device's energy reserve. Therefore, to be competitive, the manufacturers need to address the ever growing requirement for more approaches for efficient energy management.

Some Exemplary Embodiments

Therefore, there is a need for an approach for optimizing energy consumption in support of resource sharing.

According to one embodiment, a method comprises determining scheduling information relating to when one or more peer nodes can utilize a predetermined level of communication capacity for sharing a computer resource. The predetermined level of communication capacity is configured to include a maximum available bandwidth allocated to the one or more peer nodes. The method also comprises initiating transition into an active state for sharing the computer resource according to the determined scheduling information. The method further comprises initiating a transition to an inactive state during periods not specified by the scheduling information.

According to another embodiment, an apparatus comprises a processor and a memory storing executable instructions that if executed cause the apparatus to determine scheduling information relating to when one or more peer nodes can utilize a predetermined level of network resource capacity for sharing a computer resource. The predetermined level of communication capacity is configured to include a maximum available bandwidth allocated to the one or more peer nodes. The processor and memory are also configured to store scheduling information. The processor and memory are further configured to initiate transition into an active state for sharing the resource with the one or more peer nodes according to the determined scheduling information. The processor and memory are further configured to initiate a transition to an inactive state during periods not specified by the scheduling information.

According to another embodiment, a method comprises initiating negotiation with one or more peer nodes for one or more time intervals during which a predetermined level of communication capacity for sharing a computer resource is achievable. The method also comprises generating a control message to specify the time intervals. The method further comprises initiating transmission of the control message to the one or more peer nodes. The time intervals are configured to correspond to active states of the one or more peer nodes for participating in the sharing of the computer resource.

According to yet another embodiment, an apparatus comprises a processor and a memory storing executable instructions that if executed cause the apparatus to initiate negotiation with one or more peer nodes for one or more time intervals during which a predetermined level of communication capacity for sharing a computer resource is achievable. The processor and memory are also configured to store the time intervals. The processor and memory are further configured to generate a control message to specify the time intervals. The processor and memory are further configured to initiate transmission of the control message to the one or more peer nodes, the time intervals corresponding to active states of the one or more peer nodes for participating in the sharing of the computer resource.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF PREFERRED EMBODIMENT

A method and apparatus for controlling energy consumption during resource sharing are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although certain embodiments of the invention are discussed with respect to resource sharing involving computer resources such as content sharing according to a peer-to-peer (P2P) protocol (e.g., BitTorrent) on an energy-sensitive device (i.e., a device with a limited energy source), it is recognized by one of ordinary skill in the art that the exemplary embodiments of the inventions have applicability to any type of resource sharing involving any device capable of sharing the resource. It is contemplated that resource sharing as discussed herein includes, for example, sharing of processor time or navigation resources in addition to sharing of content. For instance, a peer community may share processor time by using a distributed computing application whereby instructions and/or data are sent from one peer to another peer for execution and processing. In the example of sharing navigation resources, a peer equipped with navigation capabilities (e.g., global positioning satellite (GPS) receiver or other location-based service) may share this navigation resource with one or more other peers.

Figure 1:
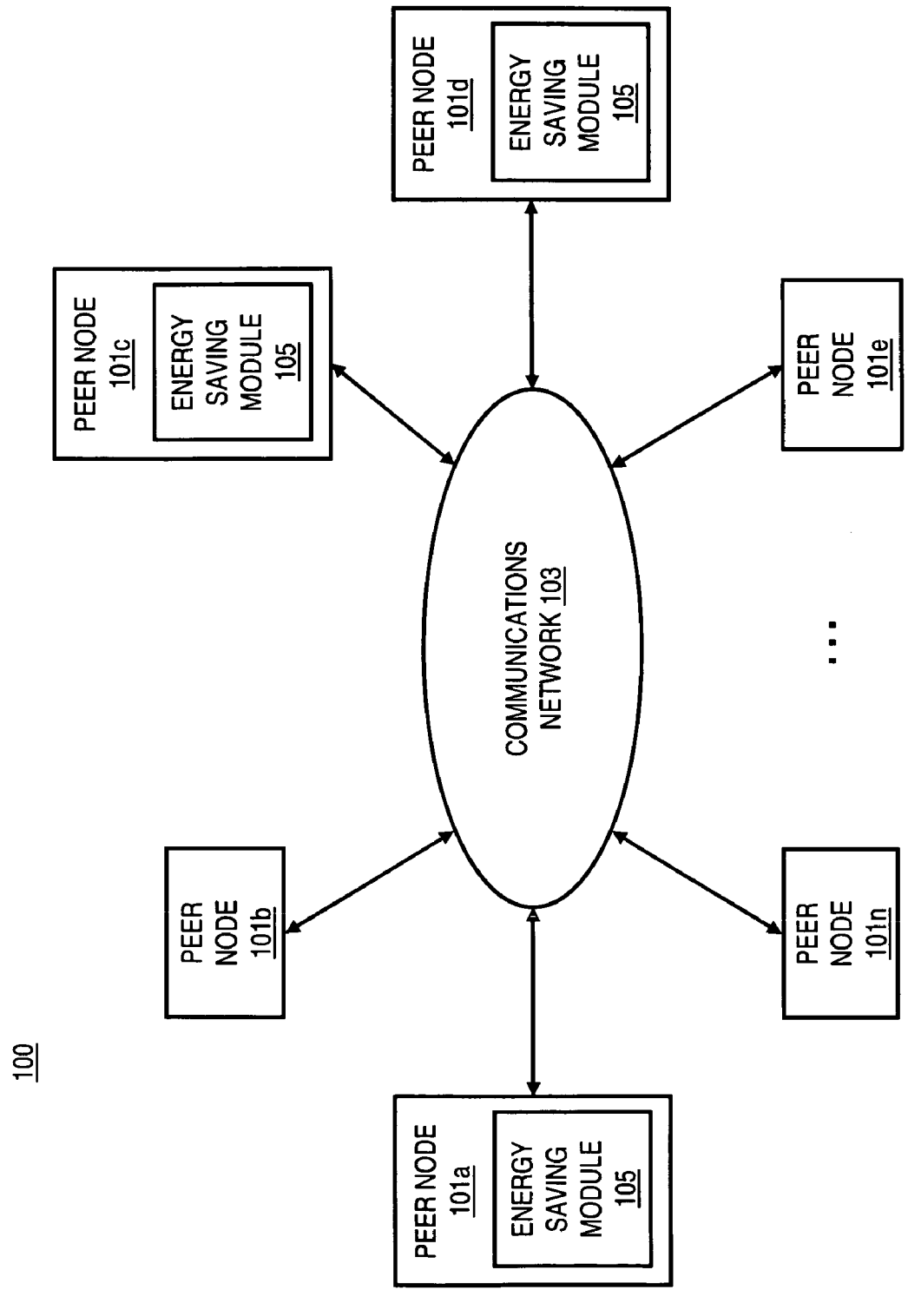
FIG. 1 is a diagram of a communication system including peer nodes capable of controlling energy consumption during resource sharing, according to an exemplary embodiment.

FIG. 1 is a diagram of a communication system including peer nodes capable of controlling energy consumption during resource sharing, according to an exemplary embodiment. As shown in FIG. 1, a system 100 comprises multiple peer nodes (e.g., peer nodes 101a-101n) having connection with each other through a communication network 103. The nodes 101a-101n, as peers, possess equal capabilities and communicate without a central point of management in an ad hoc manner. The peer nodes 101a-101n are any type of fixed terminal, mobile terminal, or portable terminal including desktop computers, laptop computers, handsets, stations, units, devices, multimedia tablets, Internet nodes, communicators, Personal Digital Assistants (PDAs), or any combination thereof. In addition, the peer nodes 101a-101n may have a hard-wired energy source (e.g., a plug-in power adapter), a limited energy source (e.g., a battery), or both. In exemplary embodiments, peer nodes 101a-101n that operate on a limited energy source (e.g., a wireless handset or portable computer operating on battery power alone) are designated as energy sensitive. It is further contemplated that the peer nodes 101a-101n can support any type of interface to the user (such as "wearable" circuitry, etc.).

According to certain embodiments, the system 100 enables the control of energy consumption by one or more of the peer nodes 101a-101n during resource sharing (e.g., sharing a computer resource according to a P2P protocol). It is noted that energy use (e.g., battery consumption) is a critical aspect of most applications running on a device, particularly when the device has a limited energy source and is operated without access to a continuous supply of electricity. As discussed previously, traditional P2P applications have energy consumption demands that exacerbate the energy supply problem and limit the use of these types of applications on energy sensitive devices. By using an energy efficient resource sharing protocol, the system of 100 minimizes energy consumption during resource sharing to enable efficient use of P2P and other resource sharing applications on energy-sensitive devices.

Specifically, the system 100 provides a mechanism for sharing resources by negotiating and scheduling time intervals during which the resource can be shared among peer nodes 101a-101n at a predetermined, configurable level of communication resource capacity (e.g., maximum available bandwidth). At all other times, the peer nodes 101a-101n that are, for instance, energy sensitive transition to an inactive state to minimize energy consumption. The approach of alternating resource sharing at maximum bandwidth with inactive periods results in decreased energy use (i.e., longer battery life) because the cumulative transfer time using this approach is decreased relative to using a traditional protocol.

The system 100 effectively improves the ratio of energy consumption to the amount of resources shared to achieve greater energy efficiency. The energy saving approach exploits the fact that the transfer rate for shared resources generally has only a minor effect on energy consumption. However, if a transfer is completely stopped (e.g., when the peer nodes 101a-101n are in an inactive state), the energy consumption is significantly less. For instance, a peer node that is a wireless device places its radio into sleep mode when the device is not actively sharing resources (e.g., during an inactive state) under this approach.

By way of example, the communication network 103 of system 100 can include one or more networks such as a data network (not shown), a wireless network (not shown), a telephony network (not shown), or any combination thereof. It is contemplated that the data network may be any local area network (LAN), metropolitan area network (MAN), wide area network (WAN), the Internet, or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, mobile ad-hoc network (MANET), and the like. The communication network 103 can support resource sharing using, for example, a peer-to-peer protocol (e.g., BitTorrent).

In this example, resources (e.g., computer resources such as content or processing time) can be shared among the peer nodes 101a-101n according to P2P sharing protocols (e.g., BitTorrent). In this context, a protocol includes a set of rules defining how the peer nodes 101a-101n interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model. The OSI Reference Model is generally described in more detail in Section 1.1 of the reference book entitled "Interconnections Second Edition," by Radia Perlman, published September 1999.

Communications between peer nodes 101a-101n are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

As shown in FIG. 1, one or more of the peer nodes (e.g., peer nodes 101a and 101c) may include, for example, an energy saving module 105 to implement the energy efficient resource sharing protocol described with respect to system 100. It is contemplated that the energy efficient resource sharing protocol of system 100 is compatible with existing protocols (e.g., BitTorrent) and can operate in a heterogeneous P2P community (e.g., a P2P community including peer nodes that are capable of energy efficient resource sharing and peer nodes that are not; and a P2P community that includes both energy sensitive and non-energy sensitive peer nodes). However, to take advantage of the energy efficient approach, the peer nodes 101 involved in the resource sharing include an energy saving module 105 or are otherwise made compatible with the energy efficient protocol.

Figure 2:
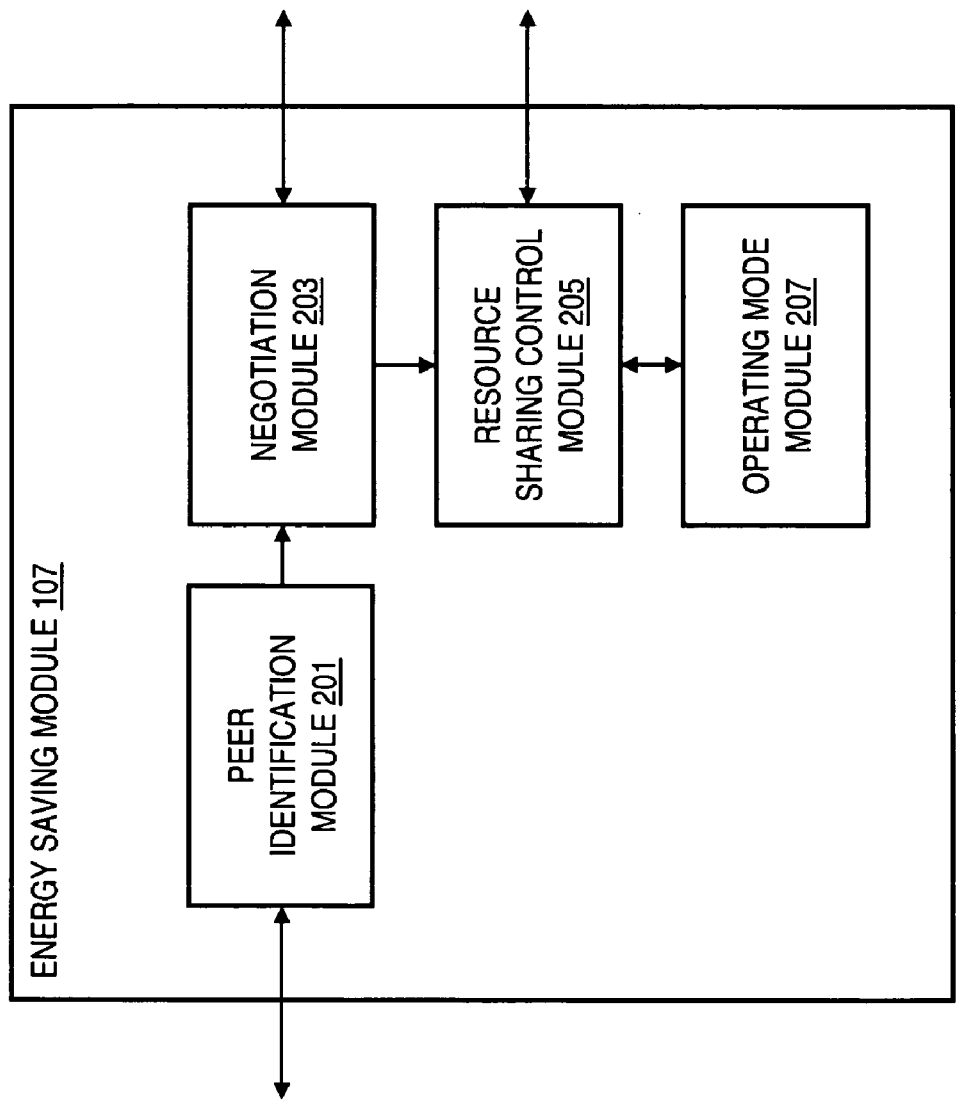
FIG. 2 is a diagram of components of an energy saving module for optimizing energy consumption during resource sharing, according to an exemplary embodiment.

FIG. 2 is a diagram of components of an energy saving module for optimizing energy consumption during resource sharing, according to an exemplary embodiment. By way of example, the energy saving module 105 includes several sub-modules to implement an energy efficient resource sharing protocol. It is contemplated that the functions of the sub-modules may be combined or performed by other components or logic of the peer node 101. In exemplary embodiments, the energy saving module 105 includes a peer identification module 201 for identifying and/or signaling other peer nodes 101 that a particular peer node 101 is capable of energy efficient resource sharing. The peer identification module 201 may also be used to identify and/or signal whether a particular peer node 101 is energy sensitive (e.g., operating with a limited energy source). Under certain embodiments, the peer identification module 201 may be configured to trigger the use of the energy efficient resource sharing protocol based on a device's energy sensitivity designation. The peer identification can take place, for instance, when a resource sharing request is either initiated or received by the peer node 101.

The negotiation module 203 then assists in determining the scheduling information to share resources among the peer nodes 101 according to the energy efficient resource sharing protocol. The scheduling information, for example, includes one or more time intervals (or slots) in which the resource sharing can be performed at the predetermined transfer rate (e.g., at a maximum available bandwidth). It is contemplated that the resource scheduling information is applicable to both single-layered and multi-layered resource sharing. As used herein, the term "single-layered" resource sharing indicates that the peer node 101 serves a single resource sharing request at one time; the term "multi-layered" resource sharing indicates that a peer node serves multiple resource sharing requests simultaneously. If the peer node 101 is engaged in multi-layered resource sharing (e.g., when downloading a computer resource such as content in parallel from multiple peer nodes 101), the scheduling information includes multiple sets of time intervals negotiated with multiple peer nodes 101.

The scheduling information determined by the negotiation module 203 may then be used by the resource sharing control module 205 to initiate the content transfer according to the determined schedule. For example, the resource sharing control module 205 interacts with the operating mode module 207 to toggle a peer node 101 between an active resource sharing state and an inactive state according to the scheduling information and the energy efficient resource sharing protocol. These state transitions are more fully described with respect to FIG. 5.

Figure 3:
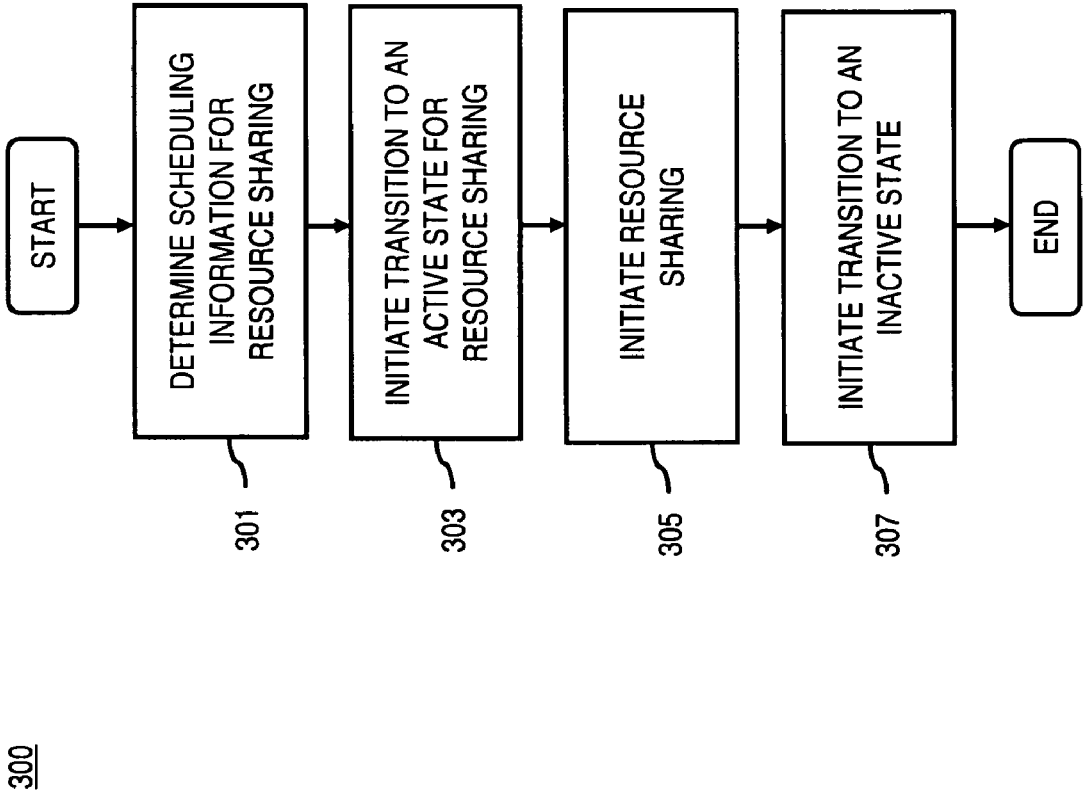
FIG. 3 is a flowchart of a process for controlling energy consumption during resource sharing, according to an exemplary embodiment.

FIG. 3 is a flowchart of a process for controlling energy consumption during resource sharing, according to an exemplary embodiment. In one embodiment, the energy saving module 105 performs the process 300 and is implemented in, for instance, a chip set including a processor and a memory as shown FIG. 9. In step 301, the module 105 determines scheduling information relating to when one or more peer nodes can utilize a predetermined level of communication capacity (e.g., a maximum available bandwidth) for sharing a resource. For single-layered resource scheduling, the module 105 determines the scheduling information through negotiation among, for instance, the two peer nodes (e.g., peer node 101a and peer node 101c which both contain an energy saving module 105) engaged in the resource sharing. For multi-layered resource scheduling, the module 105 determines the scheduling information through negotiation among all participating peer nodes.

Next, the energy saving module 105 initiates a transition into an active state for resource sharing according to the determined scheduling information (step 303). The module 105 then initiates the resource sharing according to, for example, a P2P protocol (e.g., BitTorrent) (step 305). Certain embodiments, it is contemplated that the resource sharing may be conducted according to any protocol appropriate for the resource being shared. The resource sharing (e.g., a content transfer) proceeds according to the determined schedule. At time intervals during which no active sharing is scheduled, the energy saving module 105 initiates a transition into an inactive state to conserve energy (step 307). The module 105 may initiate toggling between an active state and an inactive state repeatedly until the resource sharing is complete.

As discussed previously, exemplary embodiments include the energy saving module 105 in a peer node 101 (e.g., hardware such as a wireless handset, laptop computer, etc.).

Figure 4:
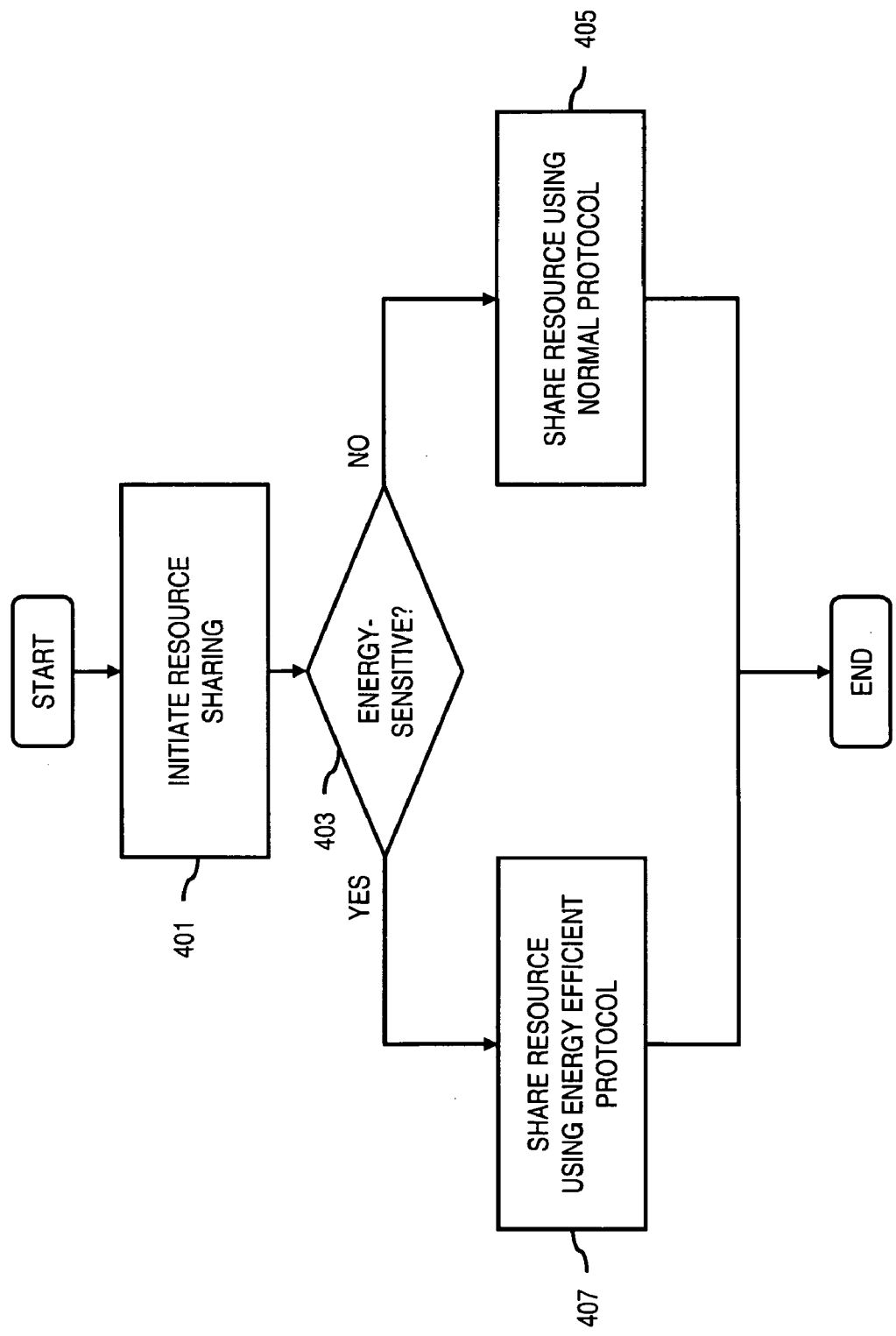
FIG. 4 is a flowchart of a process for controlling energy consumption during resource sharing using a peer node, according to an exemplary embodiment.

FIG. 4 is a flowchart of a process for controlling energy consumption during resource sharing using a peer node, according to an exemplary embodiment. In this example, the peer node 101a has initiated the request over a wireless network (e.g., cellular network) within communication network 103 and is an energy sensitive device (e.g., a wireless device operating on battery power) that includes an energy saving module 105 for supporting the energy efficient resource sharing protocol. The incorporation of the module 105 within the peer node 101 in this embodiment extends the functions of the module 105 to the network or communication system 103 in which the peer node 101 operates. In step 401, the peer node 101a initiates a request for resource sharing. The resource sharing request, for instance, may be a request to download content from the other peer nodes (e.g., peer nodes 101b-101n). After initiating the request, the peer node 101a identifies whether the peer node containing the requested content supports content transfers using the energy efficient resource sharing protocol (step 403). If the peer node containing the requested content does not include an energy saving module 105 (e.g., peer nodes 101b, 101d, and 101e), the requested content transfer proceeds according to a traditional content transfer protocol with no energy saving features (step 405). In other embodiments, the peer node 101a can be configured to wait until a peer node that includes an energy saving module 105 and has the requested resource becomes available. It is contemplated that the peer node 101a may determine whether to wait or proceed with a traditional transfer using factors such as energy reserve level, number of available peer nodes, and the like.

Otherwise, if the one or more peer nodes containing the requested content include an energy saving module 105 (e.g., peer node 101c), the content transfer can proceed using the energy efficient resource sharing protocol according to the steps discussed with respect to FIG. 3 (step 407). Under this protocol, the peer node 101a in conjunction with the peer node 101c (e.g., operating in single-layered resource sharing mode) determines a schedule of time intervals to enable the content transfer to occur at a predetermined communication capacity (e.g., at a maximum available bandwidth). The step of determining a schedule of time intervals may include additional peer nodes when engaged in multi-layered resource scheduling. It is contemplated that the scheduled time intervals may vary in duration and number based on the resources necessary to complete the content transfer. Once a schedule of time intervals is set, the peer node 101a transitions to an active state for content transfer at the specified times to transfer the requested content from peer node 101c. At other time intervals and at the completion of the transfer, the peer node 101a transitions to an inactive state to minimize energy consumption. As previously discussed, the ability to transfer content at a maximum transfer rate (i.e., maximum capacity) at set time intervals decreases the ratio of energy used per data bit transferred, thereby reducing the energy consumption for the content sharing session.

Figure 5:
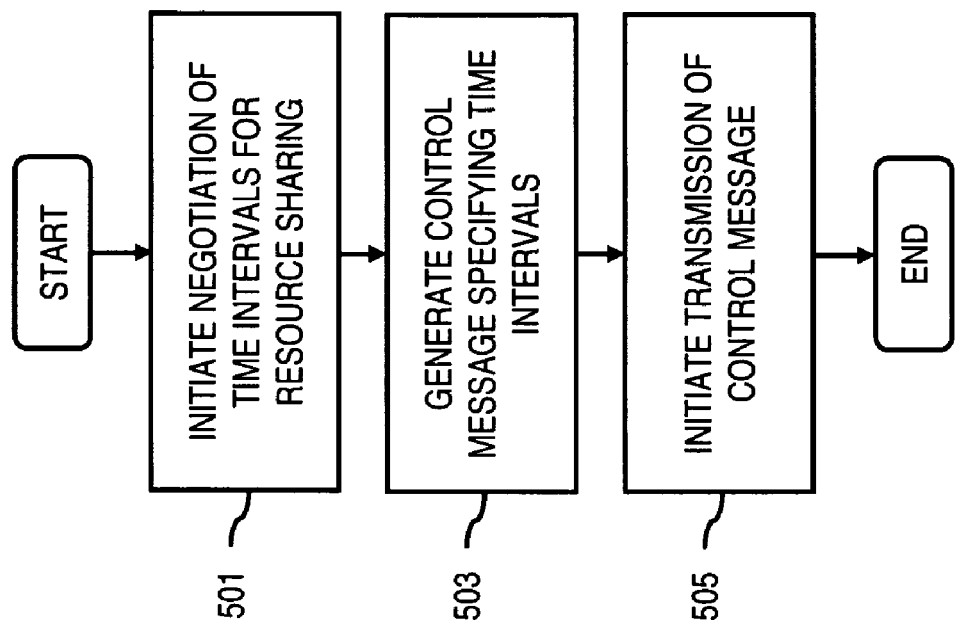
FIG. 5 is a flowchart of a process for negotiating time intervals for resource sharing, according to an exemplary embodiment.

FIG. 5 is a flowchart of a process for negotiating time intervals for content transfer, according to an exemplary embodiment. Continuing with the example of FIG. 3, the energy saving module 105 is implemented in, for instance, a chip set that is configured to perform process 500. In step 501, the module 105 initiates negotiation among participating peer nodes 101 to schedule time intervals for sharing resources at a predetermined level of communication capacity (e.g., a maximum available bandwidth). The module 105 negotiates the time intervals based factors such as pending resource sharing requests from other peer nodes 101 or the overall network traffic load corresponding to the participating peer nodes 101. As discussed previously, the negotiated time intervals may include scheduling for either single-layered or multi-layered resource sharing. In exemplary embodiments, the module 105 generates a control message specifying a schedule of the negotiated time intervals during which the participating peer nodes 101 can complete the content transfer at the maximum bandwidth (step 503). In step 505, the process then initiates the transmission of the control message to the peer node 101a.

Figure 6:
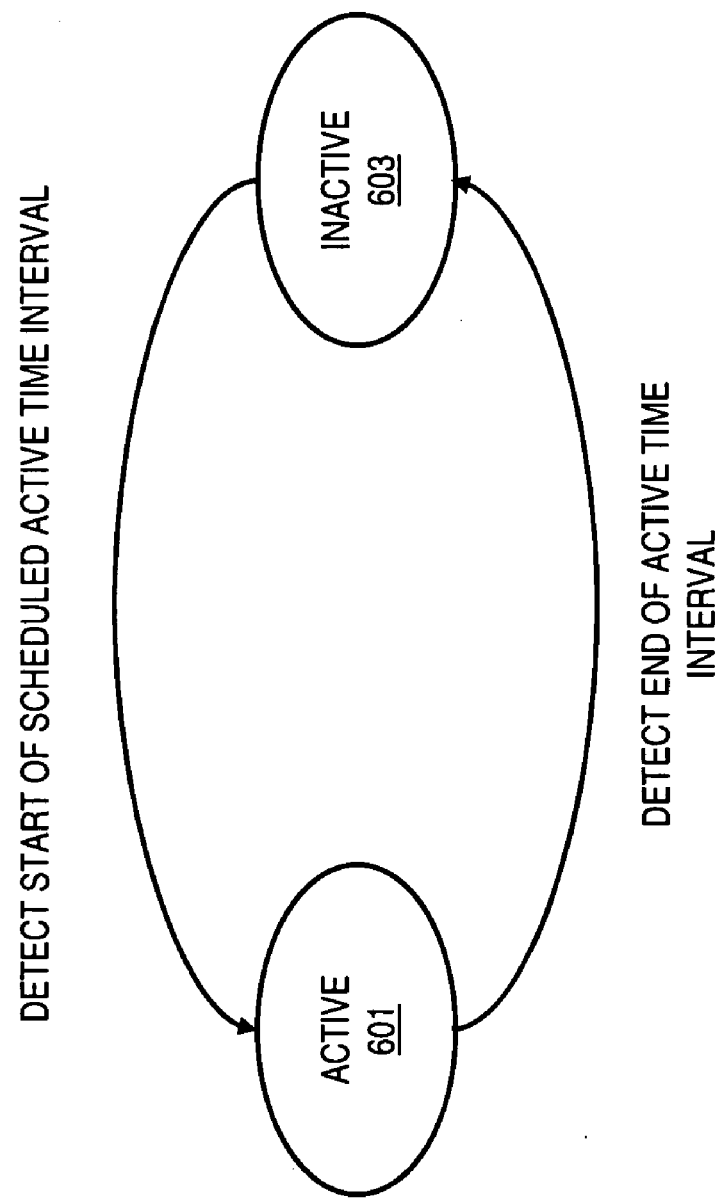
FIG. 6 is a state transition diagram for the modes of operations of a peer node, according to an exemplary embodiment.

FIG. 6 is a state transition diagram for the modes of operations of a peer node, according to an exemplary embodiment. In the example of FIG. 6, the peer node 101a has completed the negotiation steps to initiate a content sharing session according to the energy efficient resource sharing protocol and is ready to begin the transfer process using a negotiated schedule. As shown, the peer node 101a transitions between an active state 601 and an inactive ("sleep") state 603. While in the active state 601, the peer node 101a transfers content at the predetermined level of communication capacity (e.g., the maximum available bandwidth). While in the inactive state 603, the peer node 101a enters an idle mode to minimize energy use (e.g., a peer node that is a wireless handset can place its radio in sleep mode to conserve energy). In exemplary embodiments, the peer node 101a can transition to the active state 601 on detection of the start of a time interval designated for active content transfer. In other embodiments, the peer node 101a is also configured to transition to an active state based the initiation of a content transfer another peer node using the energy efficient resource sharing protocol. The peer node 101a can then transition back to an inactive state 603 on detection of the end of the active time interval. In other embodiments, the peer node 101a is also configured to transition to an inactive state if it determines that no content transfer is scheduled or in progress, the transfer rate is less than the predetermined level of network resource capacity, or the content transfer is complete. It is contemplated that the peer node 101a can transition between the active state 601 and the inactive state 603 multiple times to complete a content transfer.

Figure 7:
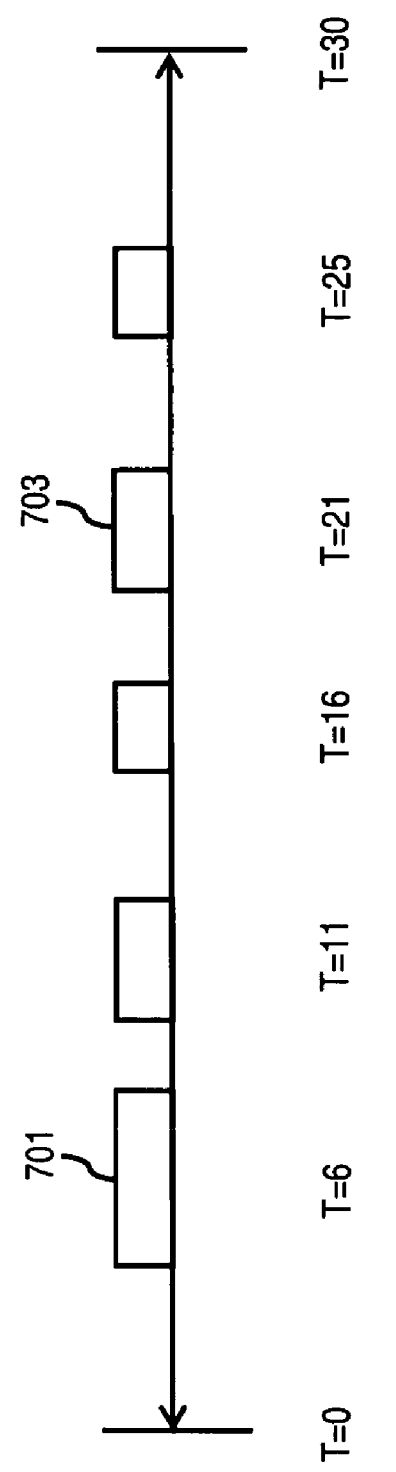
FIG. 7 is a diagram of a schedule of time slots for resource scheduling using an energy efficient resource sharing protocol, according to an exemplary embodiment.

FIG. 7 is a diagram of a schedule of time slots for resource scheduling using an energy efficient resource sharing protocol, according to an exemplary embodiment. In the example of FIG. 7, the peer node 101a negotiated a schedule according to the energy efficient resource sharing protocol that lasts for, e.g., 30 seconds. The schedule includes active time intervals (i.e., time intervals during which the resource sharing can occur a maximum communication capacity) at T=6 s, 11 s, 14 s, 21 s, and 25 s. By way of example, each active time interval may have a different duration and/or negotiated communication capacity (e.g., maximum transfer rate). For example, active time interval 701 begins at 6 s and lasts for 3 s with a designated transfer rate of 5 Kilobytes/s, and active time interval 703 begins at 21 s and lasts for 1 s with a designated transfer rate of 5 Kilobytes/s. In certain embodiments, a peer node 101a engaged in single-layered resource sharing has one set of scheduled time intervals. A peer node 101a engaged in multi-layered resource sharing has a set of schedule time intervals corresponding to each simultaneous resource sharing stream.

The processes described herein for controlling energy use during resource sharing may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 8:
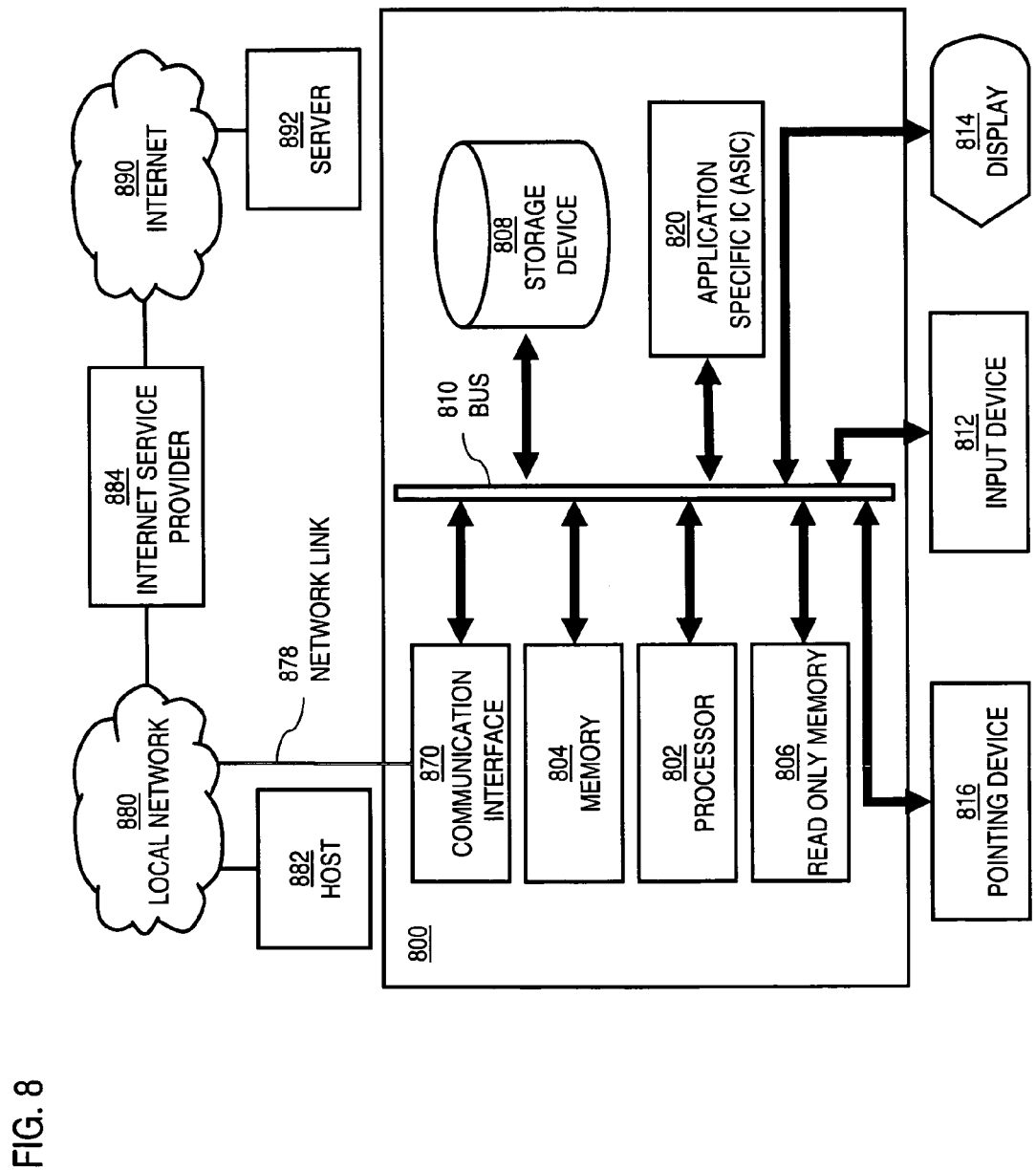
FIG. 8 is a diagram of hardware that can be used to implement an embodiment of the invention.

FIG. 8 illustrates a computer system 800 upon which an embodiment of the invention may be implemented. Computer system 800 is programmed to carry out the inventive functions described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character.

In some embodiments, information called analog data is represented by a near continuum of measurable values within a particular range.

A bus 810 includes one or more parallel conductors of information so that information is transferred quickly among devices coupled to the bus 810. One or more processors 802 for processing information are coupled with the bus 810.

A processor 802 performs a set of operations on information. The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or other dynamic storage device, stores information including processor instructions. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions, is provided to the bus 810 for use by the processor from an external input device 812, such as a keyboard containing alphanumeric keys operated by a human user, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT) or a liquid crystal display (LCD), or plasma screen or printer for presenting text or images, and a pointing device 816, such as a mouse or a trackball or cursor direction keys, or motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of application specific ICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver.

The term computer-readable medium is used herein to refer to any medium that participates in providing information to processor 802, including instructions for execution. Such a medium may take many forms, including, but not limited to, non-volatile media, volatile media and transmission media. Non-volatile media include, for example, optical or magnetic disks, such as storage device 808. Volatile media include, for example, dynamic memory 804. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Figure 9:
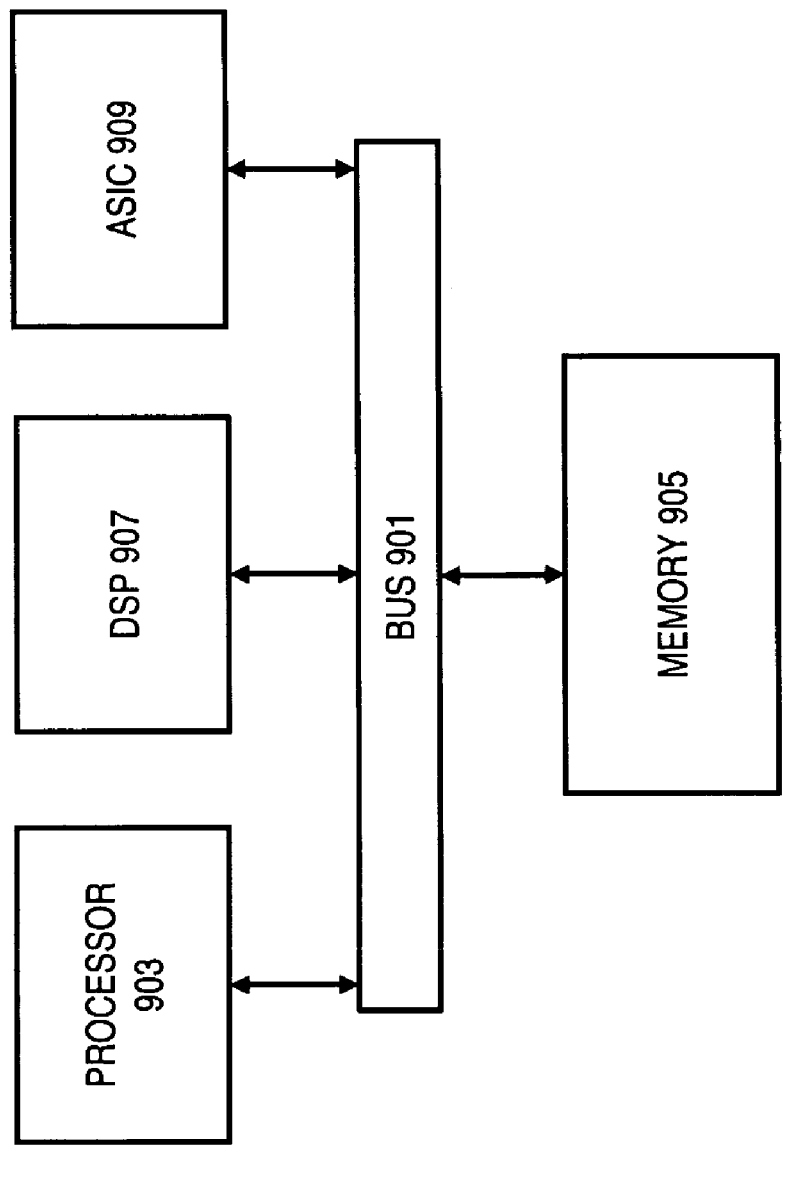
FIG. 9 is a diagram of a chip set that can be used to implement an embodiment of the invention.

FIG. 9 illustrates a chip set 900 upon which an embodiment of the invention may be implemented. Chip set 900 is programmed to carry out the inventive functions described herein and includes, for instance, the processor and memory components described with respect to FIG. 8 incorporated in one or more physical packages. By way of example, a physical package includes an arrangement of one or more materials, components, and/or wires on a structural assembly (e.g., a baseboard) to provide one or more characteristics such as physical strength, conservation of size, and/or limitation of electrical interaction.

In one embodiment, the chip set 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-word signals (e.g., sound) in real time independently of the processor 903. Similarly, an ASIC 909 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein. The memory 905 also stores the data associated with or generated by the execution of the inventive steps.

Figure 10:
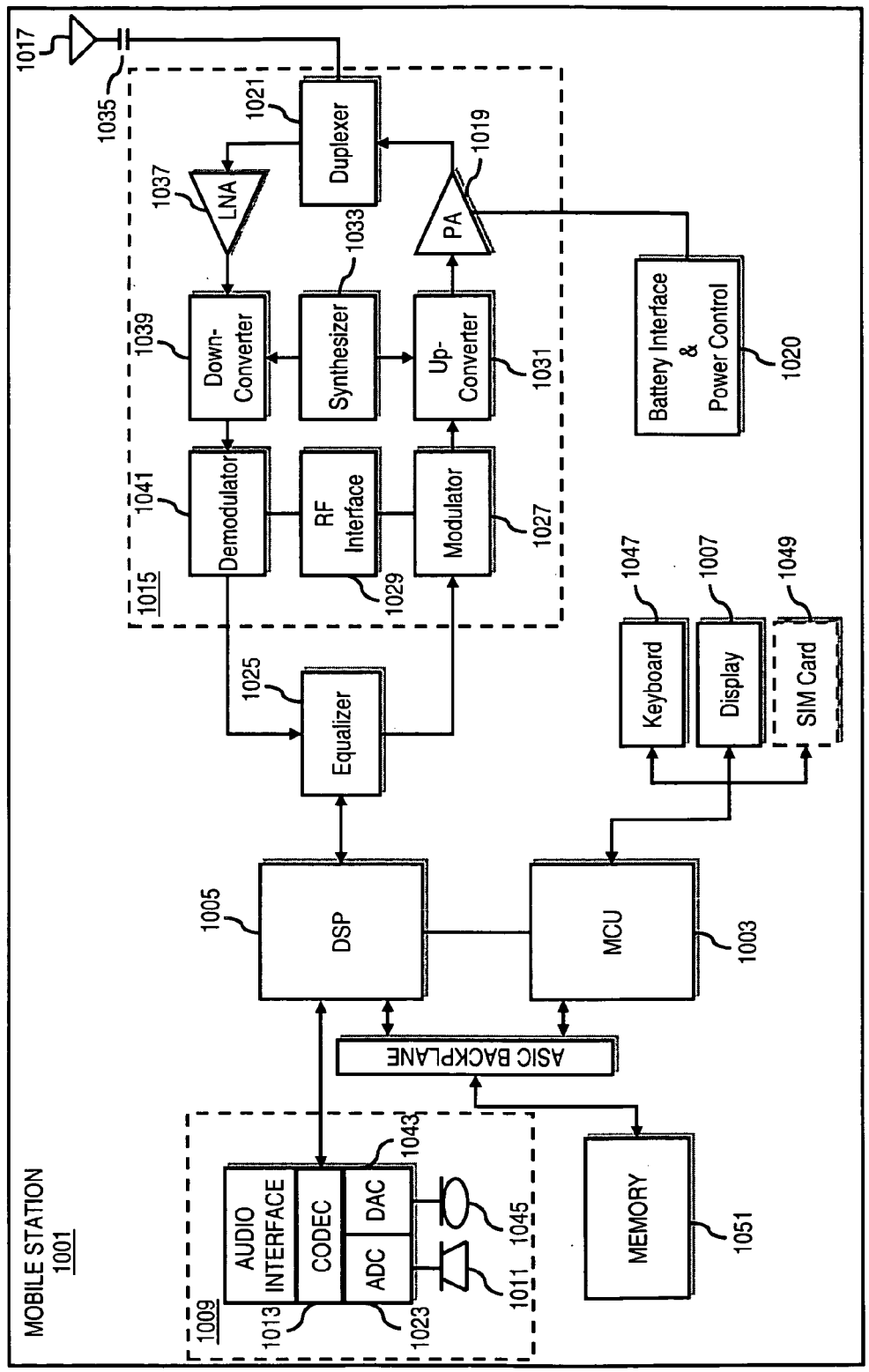
FIG. 10 is a diagram of a mobile station (e.g., handset) that can be used to implement an embodiment of the invention.

FIG. 10 is a diagram of exemplary components of a mobile station (e.g., handset) capable of operating in the system of FIG. 1, according to an exemplary embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile station functions. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile station 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In the exemplary embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003—which can be implemented as a Central Processing Unit (CPU) (not shown).

The MCU 1003 receives various signals including input signals from the keyboard 1047. The MCU 1003 delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the station. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile station 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile station 1001 on a radio network. The card 1049 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   determining scheduling information relating to when one or more peer nodes can utilize a predetermined level of communication capacity for sharing a computer resource; and
   initiating a transition into an active state for sharing the computer resource according to the determined scheduling information.

2. A method of claim 1, wherein the scheduling information includes one or more time intervals for sharing the computer resource, the method further comprising:
   determining to negotiate with the one or more peer nodes to obtain the scheduling information.

3. A method of claim 1, further comprising:
   initiating a transition into an inactive state during periods not specified by the scheduling information.

4. A non-transitory computer-readable storage medium carrying one or more sequences of one or more instructions which, when executed by one or more processors, cause an apparatus to at least perform the following steps:
   determining scheduling information relating to when one or more peer nodes can utilize a predetermined level of communication capacity for sharing a computer resource;
   determining to store the scheduling information; and
   initiating a transition into an active state for sharing the computer resource according to the determined scheduling information.

5. A non-transitory computer readable storage medium of claim 4, wherein the scheduling information includes one or more time intervals for sharing the computer resource, and the apparatus is caused to further perform:
   determining to negotiate with the one or more peer nodes to obtain the scheduling information.

6. A non-transitory computer readable storage medium of claim 4, wherein the apparatus is caused to further perform:
   initiating a transition into an inactive state during periods not specified by the scheduling information.

7. A non-transitory computer readable storage medium of claim 4, wherein the sharing of the computer resource is over a communication network that includes a wireless network.

8. A non-transitory computer readable storage medium of claim 4, wherein the predetermined level of communication capacity includes a maximum available bandwidth allocated to the one or more peer nodes.

9. An apparatus comprising:
   at least one processor; and
   at least one memory including computer program code for one or more programs,
   the at least one memory and the computer program code configured to, with the at least one processor, cause the apparatus to perform at least the following,
      determine scheduling information relating to when one or more peer nodes can utilize a predetermined level of communication capacity for sharing a computer resource;
      determine to store the scheduling information; and
      initiate a transition into an active state for sharing the computer resource according to the determined scheduling information.

10. An apparatus of claim 9, wherein the apparatus is further caused to:
    initiate the sharing of the computer resource according to a peer-to-peer protocol.

11. An apparatus of claim 9, wherein the scheduling information includes one or more time intervals for sharing the computer resource, and the apparatus is further caused to:
    determine to negotiate with the one or more peer nodes to obtain the scheduling information.

12. An apparatus of claim 9, wherein the apparatus is further caused to:
    initiate a transition into an inactive state during periods not specified by the scheduling information.

13. An apparatus of claim 9, wherein the apparatus is included in a handset configured to communicate over a communication network that includes a wireless network.

14. A method comprising:
    initiating negotiation with one or more peer nodes for one or more time intervals during which a predetermined level of communication capacity for sharing a computer resource is achievable;
    determining to generate a control message to specify the one or more time intervals; and
    initiating transmission of the control message to the one or more peer nodes,
    wherein the one or more time intervals correspond to active states of the one or more peer nodes for participating in the computer resource sharing.

15. A method of claim 14, wherein the sharing of the computer resource is over a communication network that includes a wireless network.

16. A non-transitory computer-readable storage medium carrying one or more sequences of one or more instructions which, when executed by one or more processors, cause an apparatus to at least perform the following steps:
    initiating negotiation with one or more peer nodes for one or more time intervals during which a predetermined level of communication capacity for sharing a computer resource is achievable;

determining to store the one or more time intervals;
determining to generate a control message to specify the one or more time intervals; and
initiating transmission of the control message to the one or more peer nodes, the one or more time intervals corresponding to active states of the one or more peer nodes for participating in the computer resource sharing.

17. A non-transitory computer readable storage medium of claim 16, wherein the sharing of the computer resource is over a communication network that includes a wireless network.

18. An apparatus comprising:
at least one processor; and
at least one memory including computer program code for one or more programs,
the at least one memory and the computer program code configured to, with the at least one processor, cause the apparatus to perform at least the following,
initiate negotiation with one or more peer nodes for one or more time intervals during which a predetermined level of communication capacity for sharing a computer resource is achievable;
determine to store the one or more time intervals;
determine to generate a control message to specify the one or more time intervals; and
initiate transmission of the control message to the one or more peer nodes, the one or more time intervals corresponding to active states of the one or more peer nodes for participating in the computer resource sharing.

19. An apparatus of claim 18, wherein the apparatus is included in a handset configured to share the computer resource over a communication network that includes a wireless network.

20. A method of claim 2, wherein the one or more time intervals are based, at least in part, on whether the one or more peer nodes are engaged in multi-layered resource sharing.

* * * * *